Patented May 26, 1953

2,639,579

UNITED STATES PATENT OFFICE 2,639,579

TURBOJET ENGINE HAVING TAIL PIPE EJECTOR TO INDUCE FLOW OF COOLING AIR

Andrew V. D. Willgoos, deceased, late of West Hartford, Conn., by Hartford National Bank and Trust Company of Hartford, Conn., executor, assignor to United Aircraft Corporation, East Hartford, Conn., a corporation of Delaware Original application June 21, 1949, Serial No. 100,418. Divided and this application August 4, 1951, Serial No. 240,346

10 Claims. (Cl. 60—35.6)

This invention relates to gas turbine power plants.

This application is a division of copending application Serial No. 100,418 filed June 21, 1949.

One feature of the invention is the arrangement for cooling certain of the structural elements to prevent overheating and to maintain the structural elements at the necessary low temperature to maintain the required strength. Another feature is the arrangement of the tail pipe to provide an ejector action to encourage a flow of cooling air through the power plant.

Other objects and advantages will be apparent from the specification and claims and from the accompanying drawing which illustrates an embodiment of the invention.

Figures 1, 2:
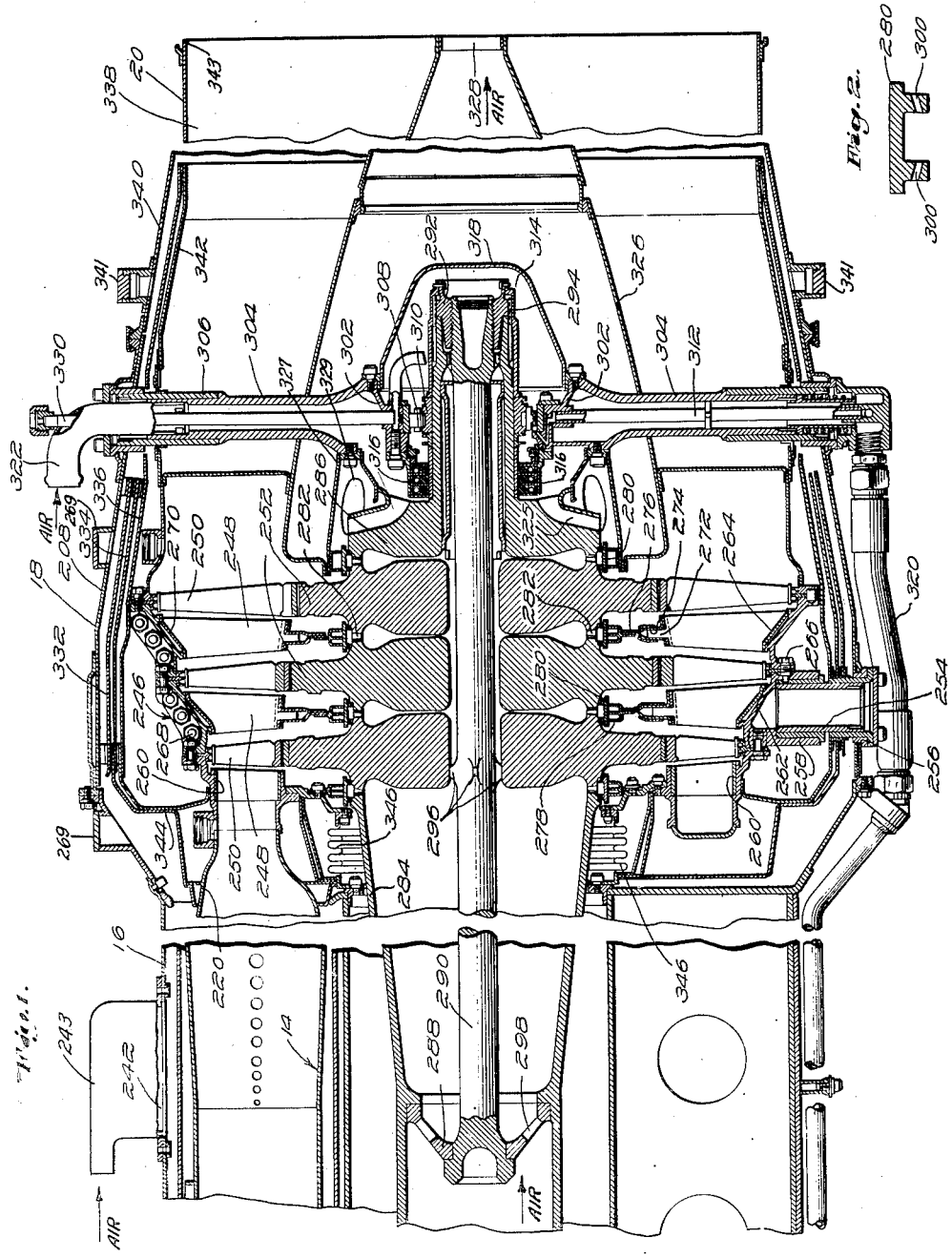
Fig. 1 is a sectional view through the turbine and thrust nozzle.
Fig. 2 is a sectional view through the seal ring which extends around the splines on the turbine rotor.

The gas turbine power plant includes a compressor (not shown) which is driven by the turbine and discharges gas into one or a series of combustion chambers 14 enclosed within a burner case 16. From the combustion chambers the air from the compressor with which fuel has been mixed and burned passes through the turbine section 18 of the power plant and is discharged through the thrust nozzle 20.

The turbine which drives the compressor includes a turbine casing 246 having spaced rows of vanes 248. Within the casing is the rotor having rows of blades 250 on discs 252 alternating with the rows of vanes. The casing is supported within the turbine housing or frame section 208 by a plurality of radially extending pins 254 positioned in radial openings 256 in the housing and fitting within bosses 258 on the turbine casing. The diameter of the casing at the point where the latter is supported is smaller than the corresponding diameter of the outer housing, to permit radial expansion of the turbine casing. In the arrangement shown, the casing is built up of a turbine inlet nozzle ring 260 and additional nozzle rings 262 and 264, each of which carries one row of the turbine vanes. These rings are bolted together as by the bolts 266 and are preferably split as shown with the halves fastened together as by bolts 268. The housing 208 may have normally capped access openings 269 therein which have no function in the operation of the device.

Each of the vanes 248 is securely attached at its outer end as by being welded to a ring 270 which is in turn welded to the corresponding casing ring. At the inner end, each turbine vane has a projecting lug 272 which fits in a groove 274 provided in a sealing element 276. The latter has inwardly extending flanges 278 which cooperate with sealing rings 280 mounted on the rotor between adjacent discs.

The turbine rotor may have the blades attached to the discs by any suitable means, the blades, in the arrangement shown, being welded to the discs. Each disc has face splines 282 on opposite ends thereof which, when the discs are assembled, intermesh and align the discs with one another. At opposite ends of the turbine discs are end-bells 284 and 286. Within the end-bell 284 is a supporting ring 288 which receives and supports the head of a through bolt 290 which extends through the discs and receives a nut 292 which engages with the opposite end-bell 286 to hold the assembly of discs together. The nut 292 may be locked in place by a splined sleeve 294. It will be noted that the discs are out of contact with the through bolts with the exception of a series of small piloting lugs 296 on the bolt which engage with the first stage disc.

Cooling air from the compressor flows through openings 298 in the ring 288 to the internal part of the turbine rotor. The face splines are so constructed that air passages exist between the bases of the grooves and the cooperating teeth so that air flows past the splines and through small openings 300, Fig. 2, provided in the sealing sleeve 280 so that air escaping through these passages flows over the surfaces of the rotor discs for cooling them.

The turbine is supported at the discharge end by a bearing support 302 having projecting legs 304 guided within the turbine housing 208 by radial pins 306. Within the bearing mounting 302 is bearing 308 engaging with a ring 310 on the outer surface of the end-bell. Lubricant is supplied to the bearing through a pipe 312 through one of the legs 304 and the bearing is enclosed within a chamber 314 by a seal 316 at one side of the bearing and a cover plate 318 supported on the bearing mounting and enclosing the end of the rotor. Oil collecting within the chamber 314 is scavenged through the same supporting leg 304 that carries the pressurized oil and is pumped out through a connecting duct 320. For the purpose of cooling the bearing, the remaining legs are provided with ram air inlets 322 which direct air into the housing around the bearing for discharge through a centrifugal fan 325 on the end-bell 286 and thence into a conical shield 326 which surrounds the turbine bearing and forms the inner wall of the gas path for the exhaust gas from the turbine. A stiffening ring 327 surrounding the fan 325 has a number of large diameter openings 329 therein. The downstream end of this cone is open as at 328 for the discharge of the cooling air from the bearing. The bearing space 314 may be vented through a standpipe 330 in one of the bearing supporting legs.

The outer turbine housing 208 is shielded from the turbine casing 246 by a series of heat shields 332, 334, and 336. Ram air entering the opening 242, as through an air scoop 243, into the space around the combustion chambers upstream of the turbine flows rearwardly and passes between the housing 208 and the outermost shield 332 and also between the outermost shield 332 and the next adjacent shield 334. The space between the innermost shields is sealed at the upstream end. The shields 332 and 334 terminate a short distance downstream of the last turbine stage but the innermost shield continues downstream to a point within the discharge duct 338 at which point the shield approaches the outer wall 340 of the duct to form a constriction in such a manner that exhaust gas flowing through the duct may cause cooling air to be ejected from the spaces between the shield. A shell 342 secured to the turbine casing 264 forms the outer wall of the passage 338 for the exhaust gas from the turbine and this shell terminates at the same point that the shield 336 terminates. The duct 338 terminates in a thrust nozzle 343 at a point downstream from the lower end of shell 342. The wall 340 may have normally capped access openings 341 which have no function in the operation of the power plant.

At the upstream end, the shields 334 and 336 have mounted thereon shield extensions 344 extending inwardly to surround the turbine inlet nozzle ring and the inlet manifold 220. The latter, as will be apparent, forms an annular chamber connecting with nozzle ring 260 and, at its upstream end, has spaced inlets connecting with the ends of the combustion chambers. The ram air pressure existing around the burners is sealed from the rotors by a flexible seal 346.

It is to be understood that the invention is not limited to the specific embodiment herein illustrated and described, but may be used in other ways without departure from its spirit as defined by the following claims.

What is claimed is:

1. In a gas turbine power plant, a turbine including a rotor and a surrounding casing, a housing surrounding the casing, supporting means extending between the turbine casing and the housing for supporting the casing within the housing, a thrust nozzle through which gas from the turbine is discharged, and an exhaust duct connecting the turbine to the nozzle, in combination with at least one radiation shield located between and spaced from the turbine casing and housing and surrounding the casing, the downstream end of the shield being concentric to and closely spaced from the exhaust duct to define an ejector located within the duct upstream of the thrust nozzle and communicating with the space between the shield and housing for maintaining a flow of cooling air therethrough.

2. In a gas turbine power plant, a turbine including a rotor and a surrounding casing, a housing surrounding the casing, supporting means extending between the turbine casing and the housing for supporting the casing within the housing, a thrust nozzle through which gas from the turbine is discharged, and an exhaust duct connecting the turbine to the nozzle, in combination with at least one radiation shield located between and spaced from the turbine casing and housing and surrounding the casing, the downstream end of the shield being concentric to and closely spaced from the exhaust duct to define an ejector located within the duct upstream of the thrust nozzle and communicating with the space between the shield and housing for maintaining a flow of cooling air therethrough, the forward end of the space between the casing and housing communicating with a source of air under pressure.

3. In a gas turbine power plant, a turbine including a rotor and a surrounding casing, a housing surrounding the casing, supporting means between the housing and casing for supporting the turbine casing within the housing, other supporting means between the housing and rotor for supporting the rotor within the housing, a thrust nozzle in axial alignment with the turbine through which gas from the turbine is discharged, and an exhaust duct from the turbine to the nozzle in combination with a shield surrounding the turbine casing and located between and spaced from the housing and casing, the downstream end of the shield being concentric to and closely spaced from the walls of the duct upstream of the nozzle and cooperating with the duct to form an ejector for causing a flow of air over the shield.

4. In a gas turbine power plant, a turbine including a rotor and a surrounding casing, a housing surrounding and supporting the turbine casing and a thrust nozzle in axial alignment with the turbine through which gas from the turbine is discharged, said nozzle having an outer wall forming a continuation of the turbine housing, in combination with a shield surrounding the turbine casing and located between the housing and casing, the downstream end of the shield being within and concentric to and closely spaced from the outer wall of the nozzle to form an ejector for causing a flow of air over the shield, the forward end of the space between the shield and housing communicating with a source of cooling air.

5. In a gas turbine power plant, a turbine including a rotor and a surrounding casing, a housing surrounding and supporting the turbine casing and a thrust nozzle in axial alignment with the turbine through which gas from the turbine is discharged, said nozzle having an outer wall forming a continuation of the turbine housing, in combination with a shield surrounding the turbine casing and located between the housing and casing, the downstream end of the shield being within and concentric to and closely spaced from the outer wall of the nozzle to form an ejector for causing a flow of air over the shield, and a forwardly directed air inlet communicating with the forward end of the space between the shield and housing.

6. In a gas turbine power plant, a turbine including a rotor and a surrounding casing, a housing surrounding and supporting the turbine casing and a thrust nozzle in axial alignment with the turbine through which gas from the turbine is discharged, said nozzle having an outer wall forming a continuation of the turbine housing, in combination with a shield located between the casing and housing, and in spaced relation thereto, and extending to a point downstream of the turbine, the downstream end of the shield being concentric to and closely adjacent to the outer wall to form an ejector nozzle.

7. In a gas turbine power plant, a turbine including a rotor and a surrounding casing, a housing surrounding and supporting the turbine casing and a thrust nozzle in axial alignment with the turbine through which gas from the turbine is discharged, said nozzle having an outer wall forming a continuation of the turbine housing, in combination with a shield located between the casing and housing, and in spaced relation thereto, and extending to a point downstream of the turbine, the downstream end of the shield being concentric to and closely adjacent to the outer wall to form an ejector nozzle, the upstream end of the space between the shield and housing communicating with a source of cooling air.

8. In a gas turbine power plant, a turbine including a rotor and a surrounding casing, a housing surrounding and supporting the turbine casing and a thrust nozzle in axial alignment with the turbine through which gas from the turbine is discharged, said nozzle having an outer wall forming a continuation of the turbine housing, in combination with a shield forming a downstream extension of the turbine casing and arranged concentrically within and spaced from the outer wall, the downstream end of said shield being concentric to and closely adjacent to said outer wall to form an ejector nozzle.

9. In a gas turbine power plant, a turbine including a rotor and a surrounding casing, a housing surrounding and supporting the turbine casing and a thrust nozzle in axial alignment with the turbine through which gas from the turbine is discharged, said nozzle having an outer wall forming a continuation of the turbine housing, in combination with a shield forming a downstream extension of the turbine casing and arranged concentrically within and spaced from the outer wall, the downstream end of said shield being concentric to and closely adjacent to said outer wall to form an ejector nozzle, and a forwardly directed air inlet connected to the upstream end of the space between the casing and housing.

10. In a gas turbine power plant, a turbine including a rotor and a surrounding casing, a housing surrounding and supporting the turbine casing and a thrust nozzle in axial alignment with the turbine through which gas from the turbine is discharged, said nozzle having an outer wall forming a continuation of the turbine housing, in combination with a shield forming a downstream extension of the turbine casing and arranged concentrically within the outer wall, the downstream end of said shield being closely adjacent to said outer wall to form an ejector nozzle, and annular radiation shields between the casing and housing around and between which a flow of air is induced by said ejector.

HARTFORD NATIONAL BANK
AND TRUST COMPANY,
By GREELY STURDIVANT,
*Trust Officer, Executor of the estate of Andrew V. D. Willgoos, deceased.*

References Cited in the file of this patent

UNITED STATES PATENTS

| Number | Name | Date |
|---|---|---|
| 2,579,114 | Halford et al. | Dec. 18, 1951 |
| 2,589,945 | Leduc | Mar. 18, 1952 |

FOREIGN PATENTS

| Number | Country | Date |
|---|---|---|
| 196,452 | Great Britain | Apr. 26, 1923 |